United States Patent [19]
Kato et al.

[11] Patent Number: 4,985,794
[45] Date of Patent: Jan. 15, 1991

[54] ROTARY DRUM DEVICE HAVING A HEAD DRIVE WITH POSITIVELY BONDED BOBBIN FIXING MEMBERS

[75] Inventors: Naoki Kato; Toshiro Tsukahara; Satoshi Yanaura; Kousuke Haraga, all of Kyoto, Japan

[73] Assignee: Mitsubishi Denki Kabushiki Kaisha, Tokyo, Japan

[21] Appl. No.: 356,098

[22] Filed: May 24, 1989

[30] Foreign Application Priority Data

May 26, 1988 [JP] Japan .................... 63-130570

[51] Int. Cl.$^5$ .................... G11B 5/53; G11B 21/18
[52] U.S. Cl. .................... 360/107; 360/84
[58] Field of Search .......... 360/107, 108, 109, 130.22, 360/130.23, 130.24, 84, 85, 95

[56] References Cited

U.S. PATENT DOCUMENTS

| | | | |
|---|---|---|---|
| 4,251,838 | 2/1981 | Saito | 360/107 |
| 4,337,492 | 6/1982 | Brookhart et al. | 360/109 |
| 4,363,046 | 12/1982 | Saito | 360/106 |

FOREIGN PATENT DOCUMENTS 0010411  1/1989  Japan .................... 360/107

Primary Examiner—David J. Severin
Attorney, Agent, or Firm—Sughrue, Mion, Zinn, Macpeak & Seas

[57] ABSTRACT

A head drive for a rotary drum device comprising a plurality of yokes made of magnetic material and magnets housed in the yokes for forming a plurality of magnetic fluxes. A bobbin, comprising a first material surrounds the magnets and has a coil formed on the bobbin. The coil is covered with a second material. At least one circular, non-magnetic leaf spring having an inner periphery and an outer periphery and supported at the outer periphery or the inner periphery by at least one of the yokes and the magnetic means supports the coil. Fixing members, comprising a third material are positioned at the inner periphery of the leaf spring. This third material is positively dissolved and welded to at least one of the first material and the second material with a bonding solvent whereby the leaf spring supports the coil. A prolongation at a portion of the outer periphery of the leaf spring can support a magnetic head.

8 Claims, 5 Drawing Sheets

ROTARY DRUM DEVICE HAVING A HEAD DRIVE WITH POSITIVELY BONDED BOBBIN FIXING MEMBERS

BACKGROUND OF THE INVENTION

This invention relates to a rotary drum device in a video tape recorder in which a magnetic head is made movable in the widthwise direction of the magnetic tape so that the magnetic record tracks are traced with high accuracy.

FIG. 4 is a sectional view showing essential components of a conventional rotary drum device. FIG. 5 is a diagram showing essential components of the rotary drum device as viewed in the direction of the arrows substantially along line V—V in FIG. 4. FIG. 6 is a diagram showing a magnetic head drive section as viewed in the direction of the arrows substantially along line VI—VI in FIG. 4. FIGS. 7 and 8 are a sectional view and a side view of the magnetic head drive section shown in FIG. 6, respectively.

In FIGS. 4 and 5, reference numeral 1 designates a lower drum; 2, a bearing coupled to the lower drum 1; 3, a rotary shaft turned while being supported by the bearing 2; 4, a base stand fitted on one end portion of the rotary shaft 3; 5, an upper drum secured to the base stand 4 with screws 6; 7, the aforementioned magnetic head drive section secured to the upper drum 5 with screws 8; 9, a lower transformer mounted on the lower drum 1; 10, an upper transformer secured to the base stand 4; 11, a wiring board mounted on the upper drum 5; 12, a stationary contact unit for supplying control current to the magnetic head drive section; 13, a rotary electrode unit installed on a part of the base stand 4 so as to contact the contact unit 12; 14, a connecting part for electrically connecting the electrode unit 13 through a connecting part 15 and the wiring board 11 to the magnetic head drive section 7; and 16, a magnetic head secured to the magnetic head drive section 7. The magnetic head 16 is electrically connected through a connecting part 17, the wiring board 11 and the connecting part 15 to the upper transformer 10.

Further in FIGS. 4 and 5, reference numeral 18 designates a recess formed in a part of the upper drum 5 to receive the magnetic head drive section 7, the recess 18 being made larger than the magnetic head drive section 7 to permit the adjustment in position of the magnetic head 16; 19, position adjusting holes for adjusting the position of the magnetic head; and 20, a magnetic tape held in slide contact with the magnetic head 16.

FIGS. 6, 7 and 8 show the magnetic head drive section 7 in more detail. In these figures, reference numeral 21 designates a first yoke of magnetic material; 22, a first permanent magnet secured to the first yoke, the first permanent magnet 22 being in the form of a bar; 23, a second yoke of magnetic material, the second yoke 23 being secured to the first yoke 21 and having an annular protrusion 23b extended from a part of the inner cylindrical wall thereof; 24, a third yoke of magnetic material secured to the second yoke; 25, a second permanent magnet in the form of a bar which is secured to the third yoke 24 in such a manner that the same magnetic poles of the first and second permanent magnets confront with each other; 26, a pole piece disposed between the first and second permanent magnets 22 and 25 and secured to one of the first and second permanent magnets; and 27, a leaf spring of non-magnetic material held between the first and second yokes 21 and 23. The leaf spring 27 has a prolongation 27a which extends through a window (21a and 23a) formed in the first and second yoke 21 and 23, and has a magnetic head 16 at the end.

Further in FIGS. 6, 7 and 8, reference numeral 28 designates a leak spring of non-magnetic material held between the second yoke and the third yoke; 29, fixing members held by the leaf springs 27 and 28, respectively; 30, a bobbin bonded to the fixing members 29 with adhesive 32 with a predetermined gap F around the outer cylindrical walls of the first permanent magnet 22, the second permanent magnet 25 and the pole piece 26; and 31, a coil formed by winding a covered wire on the bobbin in such a manner that a predetermined gap G is formed between the coil 31 and the annular protrusion 23b.

The function of the conventional rotary drum device thus constructed will be described with reference to FIG. 7. The first permanent magnet 22 sets up a magnetic flux D in a closed magnetic path of the pole piece 26, the second yoke 23 and the first yoke 21. Similarly, the second permanent magnet 25 sets up a magnetic flux E in a closed magnetic path of the pole piece 26, the second yoke 23 and the third yoke 24. The magnetic flux E is opposite in direction to the magnetic flux D. Thus, the magnetic fluxes D and E go across the annular gaps F and G in the same direction, and the total of the magnetic fluxes set up by the first and second permanent magnets 22 and 25 goes across the coil 31. When, under this condition, current is applied through the contact unit 12, the electrode unit 13 and the connecting parts 15 and 14, the coil 31, the bobbin 30 and the magnetic head 16 are moved, as one unit, linearly in a vertical direction.

Thus, the magnetic head 16 is displaced in the widthwise direction of the magnetic tape 16, to trace the magnetic record tracks.

In the conventional rotary drum device described above, the material of the bobbin 30 is different from that of the fixing members 29. Therefore, in order to secure the fixing members to the bobbin, it is necessary to use a two-solution mixing type adhesive which is expensive. And it is rather troublesome to secure the fixing members to the bobbin with the adhesive. In addition, the adhesion between the fixing members and the bobbin is low in reliability, and accordingly the rotary drum device itself is low in reliability.

SUMMARY OF THE INVENTION

Accordingly, an object of this invention is to provide a rotary drum in which the fixing members can be bonded to the bobbin more positively and more readily.

In a rotary drum device according to the invention, the materials of the bobbin and the fixing members are so selected as to be welded together, and the bobbin and the fixing members are joined together with a one-solution type bonding solvent.

In the invention, both the bobbin and the fixing members are molten with the bonding solvent; that is, they are positively welded together with the one-solution type bonding solvent.

DETAILED DESCRIPTION OF THE DRAWINGS

EMBODIMENTS OF THE INVENTION

Figure 1:
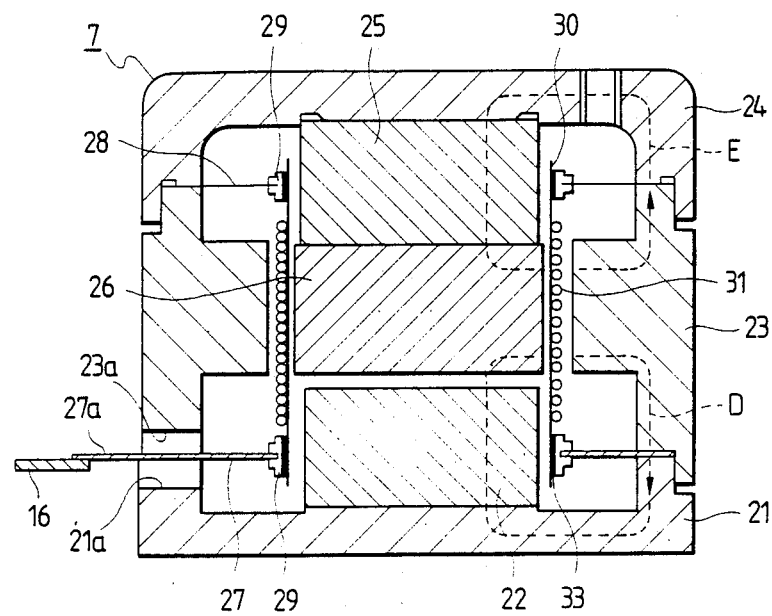
FIG. 1 is a sectional view showing a magnetic head drive section in one embodiment of this invention.

FIG. 1 is a sectional view showing a magnetic head drive section in a first embodiment of the invention. In FIG. 1, components corresponding functionally to those which have been described with reference to FIGS. 4 through 8 are therefore designated by the same reference numerals (1 through 31), and reference numeral 33 designates a bonding solvent used to bond the bobbin 30 and the fixing members 29.

The materials of the bobbin 30 and the fixing members 29 are so selected as to be soluble in the bonding solvent. The bonding solvent is of one-solution type, and the bobbin 30 and the fixing members 29, after being solved and sufficiently solidified, are positively bonded to each other; that is, the adhesion is high in reliability. In this case, materials soluble in the bonding solvent are all solvent soluble polymers; however, of the polymers, polyether sulfone, poly 2.6 dimethylparaphenylene oxide, polyvinyl formal, polyvinyl butyral, polystyrene, polymethyl methacryalte, and polycarbonate, or materials containing at least one of them are preferable because they are excellent in heat resistance. In the invention, the bonding solvent may be a solvent which can melt the materials of the bobbin and the fixing members, or one in which the materials have been dissolved; however, the latter is preferable because it is superior to the other in adhesion strength and adhesion time.

Figure 2:
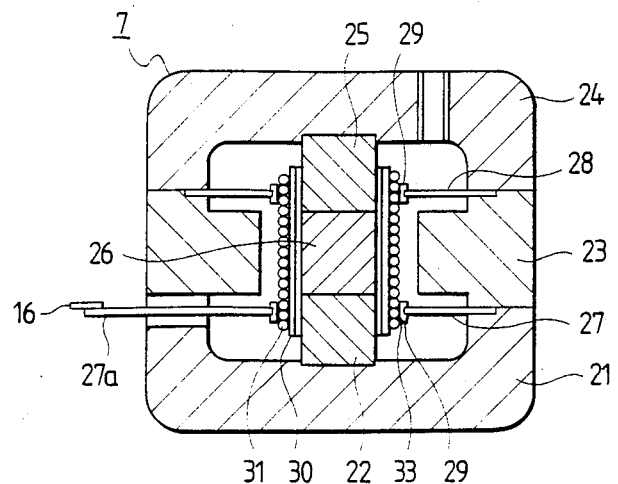
FIG. 2 is a sectional view showing a magnetic head drive section in a second embodiment of the invention.

In the above-described embodiment, the materials of the bobbin 30 and the fixing members 29 are so selected that the bobbin and the fixing members are bonded together with the solvent. However, instead of the material of the bobbin 30, the material of the cover of the coil 31 may be so selected as to be soluble in the solvent, or the cover may be coated with such material so that the coil 31 is bonded directly to the fixing members 29. FIG. 2 shows another embodiment of the invention in which the coil 31 is bonded to the fixing members 29.

Figure 3:
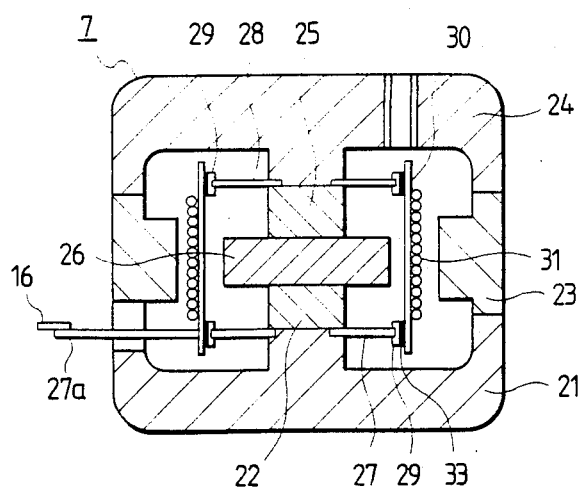
FIG. 3 is also a sectional view showing a magnetic head drive section in a third embodiment of the invention.
Figure 4:
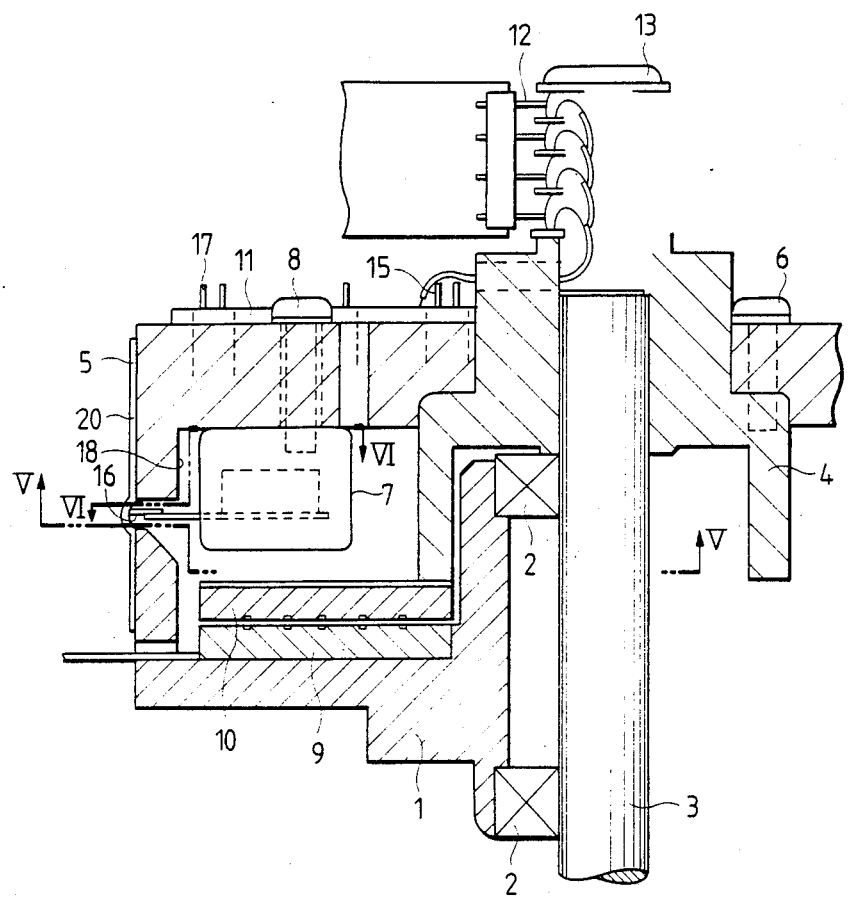
FIG. 4 is a sectional view showing essential components of a conventional rotary drum device.
Figure 5:
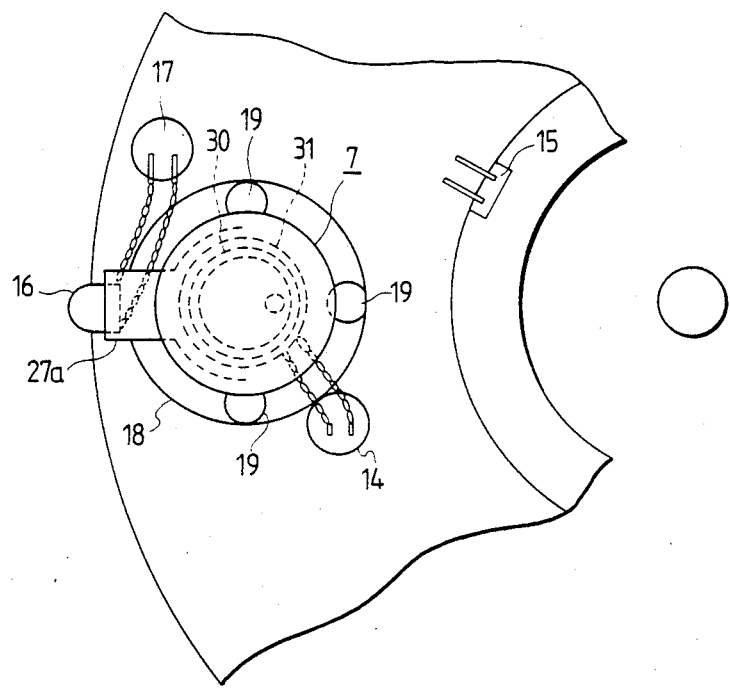
FIG. 5 is a diagram showing a magnetic head drive section in the conventional rotary drum device as viewed in the direction of the arrows substantially along line V—V in FIG. 4.
Figure 6:
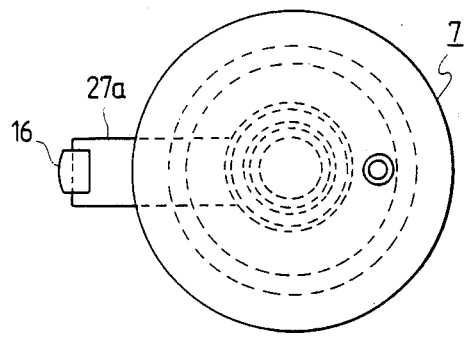
FIG. 6 is a diagram showing the magnetic head drive section as viewed in the the direction of the arrows substantially along line VI—VI in FIG. 4.
Figure 7:
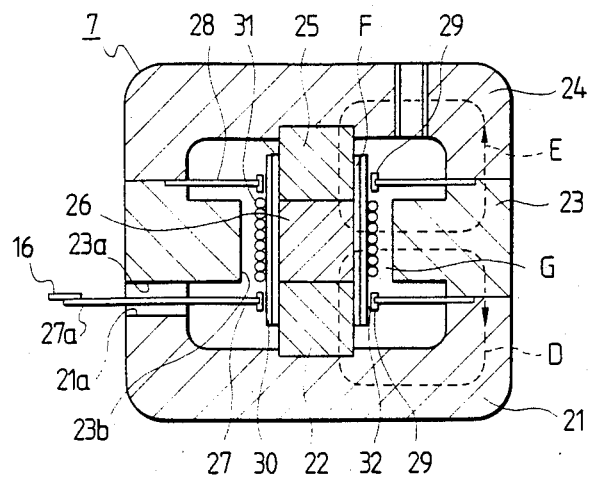
FIGS. 7 and 8 are a sectional view and a side view of the magnetic head drive section in FIG. 6.
Figure 8:
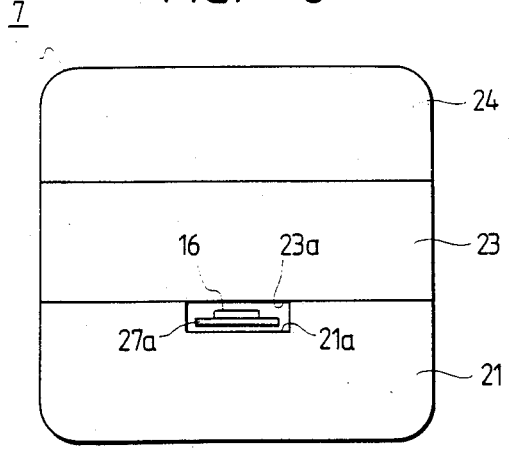

In the above-described first embodiment of the invention, the outer periphery of the leaf spring 27 is held between the first and second yokes 21 and 23, the fixing member 29 is held on the inner periphery of the leaf spring 27, and the inner periphery of the fixing member 29 is bonded to the outer wall of the bobbin 30. However, it may be modified as follows: As shown in FIG. 3, the outer periphery of the leaf spring 27 is held on the first yoke 21, the fixing member 29 is secured to the outer periphery of the leaf spring 27, and the outer periphery of the fixing member 29 is bonded to the inner wall of the bobbin 30. The modification has the same effect as the above-described embodiment.

As was described above, in the rotary drum device according to the invention, the bobbin or the cover of the coil and the fixing members are made of the materials which can be welded together. Therefore, the bobbin or the coil and the fixing members can be positively joined together; that is, the adhesion is high in reliability. Thus, the rotary drum device can be produced at low manufacturing cost and with high manufacturing efficiency accordingly.

What is claimed is:

1. A head drive for a rotary drum device comprising:
   a plurality of yokes made of magnetic material;
   magnetic means housed in said yokes for forming a plurality of magnetic fluxes;
   a bobbin, comprising a first material, surrounding said magnetic means;
   a coil formed on said bobbin and covered with a second material;
   at least one circular, non-magnetic leaf spring having an inner periphery and an outer periphery and being supported at said outer periphery or said inner periphery by at least one of said yokes and said magnetic means;
   a prolongation at a portion of said outer periphery of said leaf spring;
   fixing members, comprising a third material, positioned at said inner periphery of said leaf spring, said third material being positively dissolved and welded to at least one of said first material and said second material with a bonding solvent whereby said leaf spring supports said coil.

2. A head drive for a rotary drum device as claimed in claim 1, wherein said first material, said second material, and said third material are
   (a) selected from a group of polymers consisting of polyether sulfone, poly 2.6 dimethylparaphenylene oxide, polyvinyl formal, polyvinyl butyral, polystyrene, polymethyl methacrylate, and polycarbonate; or
   (b) materials containing at least one of the members of said group of polymers.

3. A head drive for a rotary drum device as claimed in claim 1, in which said prolongation extends radially at a part of said outer periphery of said leaf spring.

4. A head drive for a rotary drum device as claimed in claim 1, further comprising a magnetic head secured to the end of said prolongation of said leaf spring.

5. A head drive for a rotary drum device as claimed in claim 1, wherein said plurality of yokes comprises:
   a first yoke of magnetic material;
   a second yoke in the form of a hollow cylinder secured to said first yoke; and
   a third yoke of magnetic material secured to said second yoke.

6. A head drive for a rotary drum device as claimed in claim 5, wherein said magnetic means comprises:
   a first cylindrical permanent magnet in the form of a bar secured to said first yoke and surrounded by said second yoke;
   a second permanent magnet in the form of a bar secured to said third yoke in such a manner as to conform with said first permanent magnet; and
   a pole piece of magnetic material arranged between said first permanent magnet and said second permanent magnet.

7. A head drive for a rotary drum device comprising:
   a first yoke of magnetic material;
   a first cylindrical permanent magnet in the form of a bar secured to said first yoke;

a second yoke of magnetic material in the form of a hollow cylinder secured to said first yoke and surrounding said first permanent magnet;

a third yoke of magnetic material secured to said second yoke;

a second permanent magnet in the form of a bar secured to said third yoke and positioned so magnetic flux from said second permanent magnet confronts magnet flux from said first cylindrical permanent magnet;

a pole piece of magnet material arranged between said first permanent magnet and said second permanent magnet;

a bobbin, comprising a first material, surrounding said first permanent magnet, said second permanent magnet, and said pole piece;

a coil formed on said bobbin and covered with a second material;

at least one circular, non-magnetic leaf spring having an inner periphery and an outer periphery and being secured at said inner periphery or said outer periphery to at least one of said first yoke and said second yoke in such a manner as to surround said first permanent magnet;

a prolongation extended radially at a portion of said outer periphery of said leaf spring;

a magnetic head affixed to an outermost part of said outer periphery of said prolongation; and fixing members, comprising a third material, and being positioned at said inner periphery of said leaf spring, said third material positively dissolved and welded to at least one of said first material and said second material with a bonding solvent whereby said leaf spring supports said coil.

8. A head drive for a rotary drum device as claimed in claim 7, wherein said first material, said second material, and said third material are (a) selected from a group of polymers consisting of polyether sulfone, poly 2.6 dimethylparaphenylene oxide, polyvinyl formal, polyvinyl butyral, polystyrene, polymethyl methacrylate, and polycarbonate; or (b) materials containing at least one the members of said group of polymers.

* * * * *